United States Patent [19]

Wachholz et al.

[11] Patent Number: 5,028,378
[45] Date of Patent: Jul. 2, 1991

[54] SAFETY SYSTEM FOR A GAS COOLED HIGH TEMPERATURE REACTOR

[75] Inventors: Winfried Wachholz, Gorxheimertal; Ulrich Weicht, Weinheim; Rudolf Schulten, Richterich, all of Fed. Rep. of Germany

[73] Assignee: Hochtemperatur-Reaktorbau GmbH, Fed. Rep. of Germany

[21] Appl. No.: 314,965

[22] Filed: Feb. 24, 1989

[30] Foreign Application Priority Data

Feb. 24, 1988 [DE] Fed. Rep. of Germany ....... 3805736

[51] Int. Cl.$^5$ ............................................... G21C 7/36
[52] U.S. Cl. .................................... 376/216; 376/296; 376/381
[58] Field of Search ................... 376/216, 296, 381

[56] References Cited

U.S. PATENT DOCUMENTS

| | | | |
|---|---|---|---|
| 4,361,535 | 11/1982 | Friedrich | 376/215 |
| 4,713,211 | 12/1987 | Wachholz | 376/238 |
| 4,765,872 | 7/1988 | Schoening | 376/283 |

FOREIGN PATENT DOCUMENTS 3212322 4/1982 Fed. Rep. of Germany .

Primary Examiner—Donald P. Walsh
Attorney, Agent, or Firm—Robert J. Koch

[57] ABSTRACT

A safety system controlling extremely unlikely disturbances in high temperature reactors in addition to and independent of the normal reactor protection systems. Accident instrumentation located in the high temperature reactor monitors certain characteristic process parameters (hot gas temperature, cold gas temperature, cooling gas pressure), for values of which clearly exceed limiting values of the reactor pressure system. The measured data is evaluated electronically and power supply to the cooling gas blowers, feed water pumps and absorber rod holding devices is interrupted if predetermined limiting values are exceeded. The power supply interruption is further actuated by temperature and pressure sensitive devices located in the nuclear reactor. A manually operated emergency switch is provided to turn off the aforementioned sensibilities.

15 Claims, 1 Drawing Sheet

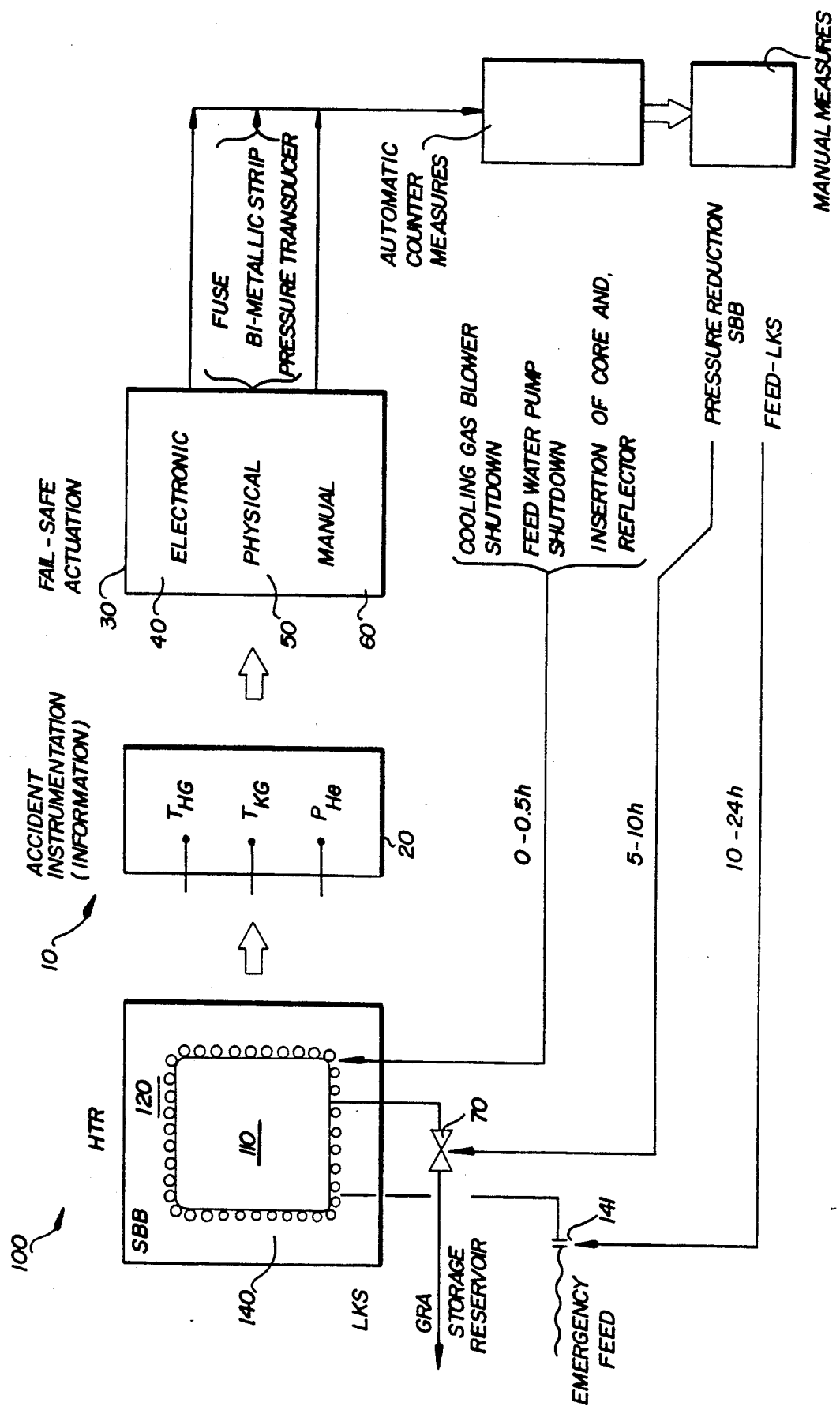

SAFETY SYSTEM FOR A GAS COOLED HIGH TEMPERATURE REACTOR

BACKGROUND OF THE INVENTION

1. Field of the Invention

The invention relates to a safety system for use in an extremely unlikely case of an accident in a gas cooled high temperature reactor, more particularly, for use in a reactor housed with a plurality of steam generators in a prestressed concrete pressure vessel, equipped with absorber rod shutdown means and a reactor protection system for actuation of emergency shut-down systems and decay heat removal.

2. Description of the Related Technology

Nuclear reactors in general and gas cooled high temperature reactors in particular, are equipped with automatic regulating and control devices, in order to prevent or limit deviations from the planned operating behavior (operational control) and to place the plant automatically into a safe state if predetermined limiting values are exceeded. The latter is the purpose of the aforementioned reactor protection system actuating the emergency shut-down and an appropriate heat removal and aftercooling procedure.

All of the cases of disturbance to be considered in the licensing procedure with a probability of occurrence higher than about 10−5/ year are controlled by the reactor protection system, i.e., the effects on the environment remain within the limits determined by the radiation protection regulations. Accidents less likely than the above are not an object to be considered in the layout of the reactor and in the licensing procedure, however, certain precautionary measures to limit such accidents are required.

High temperature reactors already possess a high degree of safety in view of their location in a prestressed concrete pressure vessel and the properties specific to high temperature reactors, even in extremely unlikely accident situations, so that the extent of damage remains limited even in such cases. The extent of damage may be reduced even more by appropriate measures. DE-OS 32 12 322, expressly incorporated by reference herein, shows a process for the control of layout and hypothetical accidents in a high temperature reactor, wherein a plurality of successive steps are given, which are always initiated following the occurrence of a certain event (accident), automatically as a matter of principle (only if an intended measure is not initiated, are emergency measures carried out manually). The steps are designed so that each of them will prevent the failure of one of the four barriers present in a high temperature reactor for the retention of fission products.

SUMMARY OF THE INVENTION

It is an object of the invention to provide a safety system for use in extremely unlikely accidents in a gas cooled high temperature reactor. The reactor together with several steam generators may be housed in a prestressed concrete pressure vessel, and shut down by absorber rods. The installation may be equipped with a reactor protection system to actuate an emergency shutdown. Utilization of the specific properties of high temperature reactors further improves limiting damage in case of extremely unlikely accidents whereby the plant may be placed into a controlled state.

This object may be attained by a reactor installation emergency shut down system characterized by the following elements:

(a) an accident instrumentation unit located in the high temperature reactor to monitor certain characteristic process parameters, which
  (1) are independent of the reactor protection system; and
  (2) the limiting values of the monitored characteristic process parameters are appreciably higher than those of the reactor protection system; and
(b) means for electronic evaluation of the measuring signals, which interrupt the supply of power to the cooling gas blowers, the feed water pumps and the absorber rod holding devices if predetermined limiting values are exceeded;
(c) several temperature or pressure sensitive devices located in the primary loop, which physically interrupt the supply of power to the cooling gas blowers, the feed water pumps and the absorber rod holding devices if the predetermined limiting value of the corresponding process parameter is exceeded; and
(d) a central emergency switch, which enables manual interruption of the supply of power to the cooling gas blowers, feed water pumps and absorber holding devices in case of a danger signal of the safety system.

As shown by accident and risk analyses of recent years, all significant accidental events or combinations may be traced to total failure of active installations for removal of decay heat, wherein the situation may be further aggravated by malfunctioning of individual systems. A disturtance situation is aggravated if:

1. the absorber rods for the shut-down of the reactor do not become effective, i.e., cannot be inserted into the reactor or are even retracted (increase in activity);
b 2. water feed pumps continue to operate, although the steam generator involved is defective and additional water is introduced into the reactor (increased reactivity, pressure buildup);
3. cooling gas blowers are running, although the cooling system of the steam generators has failed, thereby additionally damaging the steam generators and reactor installations.

The safety system according to the invention is designed so that even in extremely unlikely cases of accidents the shut-down of the cooling gas blowers and feed water pumps, and the insertion of the absorber rods is assured with a high degree of reliability. The safety system is actuated only if the limiting values of the "normal" reactor protection system are exceeded, i.e. if a safe state of the plant can no longer be attached by conventional safety measures.

The improvements obtained by the safety system according to the invention in case of accident are tabulated as follows.

Emergency shutdown/feed water pumps:
Reduction of water intrusion
Reduction of pressure buildup
Reduction of corrosion
Reduction of fission product release
Reduction of reactivity effects
Emergency shutdown/cooling gas blowers:
Prevention of steam generator overheating
Reduction of nuclear output (by automatic shutdown due to the negative temperature coefficient)

Reduction of thermal loads in the primary loop
Reduction of the pressure buildup
Emergency shutdown/absorber rods (core and reflector rods)
 Assurance of reactor shut-down
 Failure prevention of absorber rods in case of core overheating, prior to their insertion into the core.
 Guidance of roof reflector blocks upon a failure of their suspension.

According to a further development of the invention, a device is provided whereby the pressure in the prestressed concrete pressure vessel may be reduced manually, as soon as a danger signal is emitted by the safety system. Thus, the pressure vessel may be equipped with a safety valve, which relieves the pressure into the storage reservoirs of the gas purification installation. A limitation of pressure in the primary loop is favorable in all conceivable extreme situations, as in this manner the failure under excessive pressure of the closures of the concrete pressure vessel and the connecting pipelines is avoided.

It may be advantageous to further equip liner cooling systems present in all reactor pressure vessels with a manually operated device for cooling water, which is actuated only in case of a danger signal of the safety system. The operating ability of the liner cooling system may be maintained or restored, with the consequence that the reactor core and primary loop temperatures remain limited and the enclosure of the active core by the concrete pressure vessel is assured. A few characteristic process parameters suffice to detect an extreme disturbance in a high temperature reactor. These parameters, which are continuously monitored by the accident instrumentation, may be the hot gas temperature, the cold gas temperature and the pressure of the cooling gas. The data obtained is entered into an electronic evaluating device, which is actuated in the aforedescribed manner if predetermined limiting values are exceeded.

The process parameters may be further physically evaluated by temperature or pressure sensitive devices located in the primary loop. Fuses or bimetallic strips may be used as the temperature sensitive devices which interrupt power supply to the cooling gas blowers, feed water pumps and absorber rod retaining devices if the predetermined limiting temperatures are exceeded. The fuses or bimetallic strips are preferably located above and under the reactor core. Disturbances may be recognized early by temperature changes occurring in these locations.

Pressure transducers or pressure contacts may be used as pressure sensitive devices. If the predetermined limiting pressure is exceeded, the pressure transducers or contacts will interrupt power supply to the aforementioned assemblies.

BRIEF DESCRIPTION OF THE DRAWING

The Figure is a fundamental circuit diagram.

DETAILED DESCRIPTION OF THE PREFERRED EMBODIMENT

In the Figure, the abbreviations have the following meanings:
 HTR —high temperature reactor;
 GRA —gas purification installation;
 $T_{HG}$ —hot gas temperature;
 $T_{HK}$ —cold gas temperature;
 $P_{HE}$ —cooling gas pressure (helium is used as the cooling gas);
 SBB —reinforced concrete pressure vessel; and
 LKS —liner cooling system.

The time intervals given indicate how much time is available for the individual measures to limit the damaging effects of an extreme disturbance to an acceptable magnitude and respectively to place the plant into a controlled state.

With reference to the sole figure, the description and operation of the preferred embodiment of the claimed invention is as follows. In an event of a unlikely accident in which certain characteristic process parameters become appreciably higher than those necessary to trigger the reactor protection system, the safety system of the present invention may be actuated in an electronic fashion, physical fashion or manual fashion. The safety system 10 is intended for use in a gas cooled high temperature reactor system 100 having a reactor 110 housed together with steam generators in a prestressed concrete pressure vessel 120, which can be shut down by abosrber rods, and equipped with a reactor protection system (not shown) to actuate an emergency shutdown. Safety system 10 includes an accident instrumentation apparatus 20 which is located in high temperature reactor 110 to monitor certain characteristic process parameters such as hot gas temperature, cold gas temperature and cooling gas temperature. The parameters are independent of the values used for the reactor protection system and have limiting values which are appreciably higher than those values for the reactor protection system. Safety system 10 further includes an actuation system 30 having an electronic evaluation mechanism 40 for interrupting the supply of power for cooling gas blowers, fuel water pumps and absorber rod holding devices if the process parameters exceed their predetermined limiting values. Actuation system 30 also includes sensor devices 50 such as temperature or pressure sensitive devices located in a primary loop to physically interrupt the power supply to the cooling gas blowers, fuel water pumps and absorber rod holding devices. Actuation system 30 also includes a central emergency switch mechanism 60 for manual interruption of the power supply to the cooling gas blowers, feed water pumps and absorber rod holding devices in case of a safety system danger signal. Safety system 10 further includes a manually actuated mechanism 70 for reducing the pressure in the reinforced concrete pressure vessel in case of a safety system danger signal.

The safety system 10 further includes a liner cooling system 140 associated with the reinforced concrete pressure vessel 120. A manual device 141 is actuated to feed cooling water to liner cooling system 140 upon receipt of a safety system danger signal. Parameter sensor devices 50 may be temperature sensitive devices such as fuses or bimetallic strips. The temperature sensor devices may be located anywhere along the high temperature reactor but are preferably located above and under the reactor core. The parameter sensor devices may also include pressure sensitive devices such as pressure transducers or pressure contacts.

We claim:

1. A gas cooled high temperature reactor safety system for use in a reactor housed together with steam generators in a prestressed concrete pressure vessel, and shut down by absorber rods and equipped with a reactor protection system to actuate an emergency shutdown, comprising:

accident instrumentation apparatus located in the high temperature reactor to monitor certain characteristic process parameters, said parameters are: independent of the reactor protection system; and the limiting values whereof are appreciably higher than those of the reactor protection system;

electronic evaluation means for interrupting power supply to cooling gas blowers, feed water pumps and absorber rod holding devices when said process parameters exceed a predetermined limiting value;

parameter sensor devices located in a primary loop, which physically interrupts the power supply to said cooling gas blowers, feed water pumps and absorber rod holding devices if the predetermined limiting value of the corresponding process parameter is exceeded; and a central emergency switch means for manual interruption of power supply to said cooling gas blowers, feed water pumps and absorber rod holding devices in case of a safety system danger signal.

2. A safety system according to claim 1, further comprising manually actuated means for reinforced concrete pressure vessel pressure reduction in case of a safety system danger signal.

3. A safety system according to claim 2, further comprising a liner cooling system associated with said reinforced concrete pressure vessel and a manual device for feeding cooling water to said liner cooling system for actuation upon receipt of a safety system danger signal.

4. A safety system according to claim 1, wherein said process parameters are hot gas temperature, cold gas temperature and cooling gas pressure.

5. A safety system according to claim 4, wherein said parameter sensor devices comprise temperature sensitive devices which are fuses.

6. A safety system according to claim 4, wherein said parameter sensor devices comprise temperature sensitive devices which are bimetallic strips.

7. A safety system according to claim 6, wherein said temperature sensitive devices are located above and under a reactor core.

8. A safety system according to claim 4, wherein said parameter sensor devices comprise pressure sensitive devices which are pressure transducers or pressure contacts.

9. A safety system according to claim 1, further comprising a liner cooling system associated with said reinforced concrete pressure vessel and a manual device for feeding cooling water to said liner cooling system actuated upon receipt of a safety system danger signal.

10. A safety system according to claim 1, wherein said parameter sensor devices comprise temperature sensitive devices which are fuses.

11. A safety system according to claim 1, wherein said parameter sensor devices comprise temperature sensitive devices which are bimetallic strips.

12. A safety system according to claim 11, wherein said temperature sensitive devices are located above and under a reactor core.

13. A safety system according to claim 1, wherein said parameter sensor devices comprise pressure sensitive devices which are pressure transducers or pressure contacts.

14. A safety system according to claim 10, wherein said temperature sensitive devices are located above and under a reactor core.

15. A safety system according to claim 5, wherein said temperature sensitive devices are located above and under a reactor core.

* * * * *